| United States Patent [19] | [11] 3,780,496 |
| Ward, III et al. | [45] Dec. 25, 1973 |

[54] SULFONATED POLYXYLENE OXIDE AS A PERMSELECTIVE MEMBRANE FOR GAS SEPARATIONS

[75] Inventors: William J. Ward, III; Robert M. Salemme, both of Schenectady, N.Y.

[73] Assignee: General Electric Company, Schenectady, N.Y.

[22] Filed: July 31, 1972

[21] Appl. No.: 276,753

[52] U.S. Cl. .................................................. 55/16
[51] Int. Cl. ............................................ B01d 53/22
[58] Field of Search ............... 55/16, 158; 210/321, 210/500

[56] References Cited
UNITED STATES PATENTS

| 3,350,844 | 11/1967 | Robb | 55/16 |
| 3,709,774 | 1/1973 | Kimura | 55/16 |
| 3,735,559 | 5/1973 | Salemme | 55/16 |

*Primary Examiner*—Charles N. Hart
*Attorney*—John F. Ahern et al.

[57] ABSTRACT

Sulfonated polyxylylene oxide membranes are very effective for the separation of helium, hydrogen and oxygen from gas mixtures. The discovery that the permeability of the aforementioned gases varies with the counter ion form of the sulfonated polyxylylene oxide membrane used is also disclosed.

7 Claims, No Drawings

SULFONATED POLYXYLENE OXIDE AS A PERMSELECTIVE MEMBRANE FOR GAS SEPARATIONS

BACKGROUND OF THE INVENTION

Considerable interest has developed in the recovery of hydrogen and helium and in the enrichment of oxygen in air. Thus, hydrogen recovery is common from off-gas streams in refineries and petrochemical plants. The largest source of hydrogen is from catalytic reforming and refinery feeds. Significant quantities of hydrogen are also recovered from hydrodesulfurizing operations and olefin production. Hydrogen is also removed from synthesis gas reducing the $H_2/CO$ ratio for oxo synthesis.

Over the past few years, there has been intermittent interest in recovering helium from natural gas and the enrichment of oxygen in air has been investigated for the production of favorable ambients for individuals suffering from asthma and emphysema, heart disease, and other ailments.

SUMMARY OF THE INVENTION

Non-porous, semipermeable sulfonated polyxylylene (also referred to as "polyphenylene") oxide membranes have been found of particular advantage in certain gas separations. Thus, sulfonated polyxylylene oxide membranes provide the unique combination of high permeability to hydrogen and high selectivity for hydrogen versus nitrogen, carbon monoxide, methane, and higher hydrocarbons (ethane, propane, butane, ethylene, for example). These gas separation properties are optimized when certain counter ion forms of the sulfonated polyxylylene membrances are employed. Also, sulfonated polyxylylene oxide membrances provide a higher oxygen/nitrogen separtion factor and any other material of comparable permeability. Further, the helium permeability through these membrane materials and the separation factor afforded thereby for helium over nitrogen and helium over methane indicates that sulfonated polyxylylene oxide membranes may provide the basis for a commercial helium recovery system.

DESCRIPTION OF THE PREFERRED EMBODIMENT

The preparation of arylene oxide polymers (specifically poly 2,6-dimethylphenylene oxide, referred to hereinafter as "polyxylylene oxide") is described in U.S. Pat. No. 3,350,844 — Robb. The use of thin membranes of polyxylylene oxide for helium recovery from natural gas, for the separation of hydrogen from deuterium or tritium and for the separation of nitrogen from air is also described in the Robb patent (incorporated by reference).

Polyxylylene oxide is readily sulfonated using chlorosulfonic acid as the sulfonating agent. The basic method has been described in the patent literature (U.S. Pat. No. 3,259,592 – Fox et al.) and more recently in a report by Plummer, Kimura, and LaConti [Development of Sulfonated Polyphenylene Oxide Membranes for Reverse Osmosis — Final Technical Report under O.S.W. Contract 14-01-001-2114 (Jan. 1970)].

The chemical reaction involved is

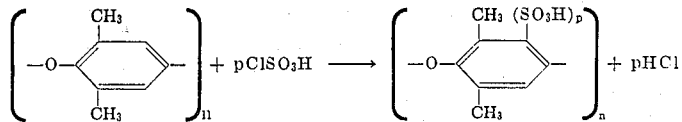

where $p$ may vary from 0 to 1. Essentially, polyxylylene oxide is dissolved in chloroform, and the sulfonating agent, $ClSO_3H$ diluted with $CHCl_3$, is added dropwise to the stirred polymer solution. As the reaction proceeds, the initially golden liquid becomes red, and then brown. As the degree of sulfonation increases, a polymer-rich phase separates, and finally when the ion exchange coefficient (IEC) approaches 3, polymer begins to precipitate from solution. The sulfonation reaction can be terminated at any time so that polymer of a particular IEC may be recovered from the reaction mixture. The reaction is exothermic, but when the $ClSO_3H$ mixture is added dropwise, overheating is not a problem, and the reaction may be run at room temperature.

Sulfonated polyxylylene oxide is an ion exchange material with the unique property of being solvent castable into a film. When this ion exchange material is placed in water, the active groups dissociate and the counter ion becomes mobile and subject to displacement by other cations which may be present in solution. Thus, films of sulfonated polyxylylene oxide may be readily converted to a number of different counter ion forms. However, the hydrogen ion form of sulfonated polyxylylene oxide is unstable. The degradation reaction involves sulfone formation with accompanying crosslinking with liberation of $H_2SO_4$. Conversion to a different counter ion form is effected by soaking a sulfonated polyxylylene oxide film of the hydrogen ion form in 200–300 ml of a 1 molar solution containing the desired cation for 24 hours. Thereafter the film is rinsed in distilled water to remove any ions not chemically bound to the polymer.

The sulfone-forming reaction does not take place when the polymer is in a salt form. Conversion to a stable salt form can generally be accomplished by contacting the solid polymer with an aqueous salt solution containing an excess of the desired counter ion. If a base such as sodium or potassium hydroxide solution is used, an excess is not required, because the hydrogen ion concentration in solution will be maintained at a low level through neutralization with the hydroxyl ion. After equilibrating the polymer with the salt solution, the solid is rinsed with distilled water to remove excess electrolytes, and dried.

Once the polymer has been converted to a stable salt form, it can be stored for long periods of time and may be heated to moderate temperatures for reasonable lengths of time without decomposition, discoloration, or crosslinking.

Membranes prepared from sulfonated polyxylylene oxide (IEC = 2.3 mequiv/gm) were cast on clean glass plates using a doctor blade set with a 7 to 10 mil space between the casting plate and the blade. Film was cast from a 10% by weight polymer solution in which the solvent consisted of 2 parts $CHCl_3$ and 1 part $CH_3OH$ by weight. Immediately after casting, the plate was covered over with an inverted glass dish to decrease the rate of solvent evaporation. This method produced clear, smooth films 0.5 to 1 mil thick.

When the membrane had dried thoroughly, disks of the appropriate size were cut using a razor blade and these membrane disks were lifted from the glass plate. A current of moist air directed onto the membrane facilitates its removal from the plate. Alternately, the membrane may be floated from the plate by immersion in water.

The very selective separation of water vapor from other gases by the use of sulfonated polyxylylene oxide membranes is described in application Ser. No. 222,754 — Salemme, filed Feb. 2, 1972, now U.S. Pat. No. 3,735,559 and assigned to the assignee of the instant invention.

separation factor, because when the separation factor is determined (for gases permeating the same film) the quantity $l$, as well as A and V, cancels.

Table I presents gas permeability data for sulfonated polyxylylene oxide (IEC=2.3) films in various counter ion forms. Table II lists separation factors for specific gas combinations. It appears, that in general permeabilities are higher for films in the transition metal counter ion forms and in the stannic ion form. It should be noted that methane permeability is low. Permeability to higher molecular weight members of the methane series is still lower. Measurements for a sulfonated polyxylylene/oxide film (IEC=2.3) in the hydrogen ion form yielded permeabilities for methane, ethane, propane and butane of 0.073; 0.030; 0.002, and less than 0.001, respectively.

TABLE I $Pr \times 10^9$ cc. (RTP), cm. thick/sec., sq. cm., $\Delta P$ (cm.Hg)

| Gas | Counter ion | | | | | | | | | | | | | | |
|---|---|---|---|---|---|---|---|---|---|---|---|---|---|---|---|
| | $H^+$ | $Na^+$ | $K^+$ | $Li^+$ | $Cs^+$ | $Sr^{++}$ | $Mg^{++}$ | $Ca^{++}$ | $Ba^{++}$ | $Co^{++}$ | $Ni^{++}$ | $Cu^{++}$ | $Cr^{+++}$ | $Fe^{+++}$ | $Sn^{++++}$ |
| $O_2$ | 0.636 | 0.697 | 0.786 | 0.631 | 0.512 | 0.630 | 0.714 | 0.646 | 0.792 | 0.992 | 0.822 | 0.941 | 1.195 | 0.71 | 0.853 |
| $N_2$ | .100 | .125 | .135 | .107 | .088 | .104 | .116 | .106 | .124 | .160 | .130 | .153 | .213 | .122 | .149 |
| CO | .125 | .130 | .202 | .206 | .140 | .198 | .198 | .177 | .226 | .399 | .249 | .279 | .493 | .236 | .255 |
| Ar | .167 | .235 | | .216 | .162 | .210 | .216 | .192 | .250 | .338 | .256 | .306 | .432 | .260 | .326 |
| $CO_2$ | 2.68 | 3.89 | 3.27 | 3.84 | 3.03 | | 3.68 | 3.38 | 4.26 | 5.70 | 4.63 | 5.23 | 7.51 | 4.08 | 4.42 |
| He | 4.36 | 6.72 | 5.56 | 6.61 | 4.49 | 5.93 | 7.20 | 6.15 | 6.35 | 8.54 | 7.44 | 8.64 | 9.48 | 6.43 | 5.88 |
| $H_2$ | 5.09 | 8.70 | 7.14 | 8.55 | 5.94 | 7.70 | 8.85 | 7.85 | 8.50 | 11.54 | 9.92 | 11.38 | 13.15 | 8.59 | 7.66 |
| $CH_4$ | 0.073 | 0.08 | .079 | 0.085 | 0.100 | 0.078 | | | 0.15 | 0.136 | 0.097 | 0.117 | 0.181 | 0.098 | 0.134 |

TABLE II.—SEPARATION FACTOR

| Separation | Ionic form | | Counter ion | | | | | | | | | | | | |
|---|---|---|---|---|---|---|---|---|---|---|---|---|---|---|---|
| | $H^+$ | $Na^+$ | $K^+$ | $Li^+$ | $Cs^+$ | $Sr^{++}$ | $Mg^{++}$ | $Ca^{++}$ | $Ba^{++}$ | $Co^{++}$ | $Ni^{++}$ | $Cu^{++}$ | $Cr^{+++}$ | $Fe^{+++}$ | $Sn^{++++}$ |
| $O_2/N_2$ | 6.36 | 5.58 | 5.84 | 5.94 | 5.82 | 6.06 | 6.13 | 6.08 | 6.4 | 6.22 | 6.32 | 6.15 | 5.61 | 5.83 | 5.73 |
| $He/CH_4$ | 59.7 | 83.9 | 70.5 | 77.9 | 44.9 | 76.0 | | | ~42 | 62.7 | 76.6 | 73.8 | 52.9 | 65.6 | 43.9 |
| $H_2/CH_4$ | 69.6 | 108.9 | 90.5 | 100.6 | 59.4 | 98.7 | | | ~56 | 84.9 | 102.2 | 97.3 | 72.6 | 87.7 | 57.2 |
| $H_2/CO$ | 40.7 | 67 | 35.5 | 41.5 | 42.4 | 38.9 | 44.7 | 44.4 | 37.6 | 28.9 | 39.8 | 40.7 | 26.7 | 36.4 | 30.0 |
| $H_2/N_2$ | 50.9 | 69.6 | 52.9 | 80.0 | 67.5 | 74.0 | 76.3 | 74.1 | 68.5 | 72.2 | 76.3 | 74.4 | 61.8 | 70.2 | 51.4 |

The gas permeability data set forth in the following tables was obtained from measurements made using a 2-chamber steady-state method. A constant pressure of the permeating gas was maintained on one side of the membrane, and the flux of gas diffusing through the membrane into the initially evacuated low-pressure chamber was observed by monitoring the rate of increase of pressure using a Granville-Phillips capacitance manometer. The permeability was determined by the relationship $$Pr = (298 l\ V)/(760\ A\ \Delta P\ T)\ (\Delta P'/\Delta t)$$

Pr is the permeability, A is the cross-sectional area of the membrane, $\Delta P$ is the transmembrane pressure difference, $l$ is the membrane thickness, V is the volume, T is the temperature and $\Delta P'/\Delta t$ is the rate of increase of pressure in the low-pressure chamber due to the incoming permeating gas.

T and $\Delta P$ were measured easily with conventional equipment. The slope $\Delta P'/\Delta t$ was measured quite accurately and reproducibly using the capacitance manometer. Control and measurement of membrane thickness are, however, somewhat problematic and are the weakest points in the permeability calculation. Inaccuracies in determining this number could introduce an error of up to ± 10 percent in the permeability.

A number that is as important as the permeability is the separation factor, $\alpha_{A/B}$, the ratio of permeabilities of two gases. Fortunately, any inaccuracy in measurement of the membrane thickness does not influence the Table III compares permeability data for polyxylylene (PPO) polymer and for sulfonated polyxylylene (SPPO) polymer in the chromic ion form. The magnitude of gas permeabilities for these two materials is comparable, but it is seen that separation factors for some gas combinations are much more favorable for the sulfonated polymer (IEC=2.3).

TABLE III

| $Pr \times 10^9 \frac{cc., cm.\ thick}{sec., sq.\ cm., \Delta P\ (cm.\ Hg.)}$ | | | Separation Factor | | |
|---|---|---|---|---|---|
| Gas | PPO | SPPO ($Cr^{+++}$) | Gas | PPO | SPPO ($Cr^{+++}$) |
| $O_2$ | 1.7 | 1.195 | $O_2/N_2$ | 4.86 | 5.61 |
| $N_2$ | 0.35 | 0.213 | $H_2/N_2$ | 34.3 | 61.8 |
| CO | 0.6 | 0.493 | | | |
| Ar | 0.76 | 0.432 | | | |
| $CO_2$ | 8.4 | 7.51 | | | |
| He | 8.4 | 9.48 | $He/CH_4$ | 21 | 52.4 |
| $H_2$ | 12.0 | 13.15 | $H_2/CH_4$ | 30 | 72.6 |
| $CH_4$ | 0.4 | 0.181 | | | |

Table IV summarizes the pertinent permeability data for polytetrafluorethylene and sulfonated polyxylylene oxide polymer in some of the more favorable counter ion forms. Selectivity for helium over nitrogen and methane is much more favorable for sulfonated polyxylylene oxide polymer. Also sulfonated polyxylylene oxide polymer is more permeable to helium than is the polytetrafluoroethylene polymer.

TABLE IV

| Polymer member | T, °C. | $Pr \times 10^9$ cc. (RTP), cm. thick/ sec. sq. cm. $\Delta P$ (cm. Hg) | | | $\alpha$ | |
|---|---|---|---|---|---|---|
| | | He | $N_2$ | $CH_4$ | $He/N_2$ | $He/CH_4$ |
| Polytetrafluoroethylene | 30 | 6.2 | 0.25 | 0.14 | 25 | 44 |
| $SPPO(Na^+)$ | 25 | 6.7 | .125 | .08 | 54 | 84 |
| $SPPO(Ca^{++})$ | 25 | 8.6 | .153 | .117 | 56 | 74 |
| $SPPO(Cr^{+++})$ | 25 | .5 | .213 | .181 | 45 | 53 |

Table V summarizes hydrogen permeability data and $H_2/CH_4$ separation factors for several membrane materials. Silicone rubber has high hydrogen permeability, but is selective for hydrocarbons over hydrogen. Sulfonated polyxylylene oxide polymer exhibits the most favorable combination of permeability and selectivity of the membranes listed.

TABLE V $$Pr_{H_2} \times 10^9 \ \frac{\text{cc. (RTP), cm. thick}}{\text{sec., sq. cm. } \Delta P \text{ (cm. Hg.)}}$$

| Material | | $\alpha$ $H_2/CH_4$ |
|---|---|---|
| Silicone rubber | 65 | 0.68 |
| Polycarbonate | 1.4 | 31.1 |
| Polyxylylene polymer | 12 | 30.0 |
| $SPPO(Na^+)$ | 8.7 | 108.9 |
| $SPPO(Cr^{+++})$ | 13.2 | 72.5 |
| $SPPO(Cu^{++})$ | 11.4 | 97.3 |
| $SPPO(Ni^{++})$ | 9.92 | 102.2 |

What we claim as new and desire to secure by Letters Patent of the United States is:

1. The method of removing a gas selected from the class consisting of hydrogen, oxygen and helium from a gas mixture containing said selected gas, which method comprises the steps of:

a. bringing the gas mixture into contact with one side of a thin, non-porous membrane consisting essentially of sulfonated polyxylylene oxide,
   b. maintaining a pressure differential in said selected gas across said membrane between said one side and the opposite side of said membrane with the lower pressure being on said opposite side and
   c. removing the product gas stream from said opposite side.

2. The method recited in claim 1 wherein the form of the sulfonated polyxylylene oxide counter ion is selected from the group consisting of a transition metal ion and the stannic ion.

3. The method of claim 1 wherein oxygen is separated from pressurized air brought to the one side of the membrane and is added to air at atmospheric pressure on the opposite side thereof to produce an oxygen-enriched air flow.

4. The method of claim 1 wherein hydrogen is separated from a hydrogen/hydrocarbon gas mixture.

5. The method of claim 1 wherein hydrogen is separated from a gas mixture containing hydrogen and carbon monoxide.

6. The method of claim 1 wherein helium is separated from natural gas.

7. The method of claim 6 wherein the natural gas is predominantly methane and other hydrocarbon gases.

* * * * *